Patented May 30, 1950

2,509,654

UNITED STATES PATENT OFFICE 2,509,654

FLUXES FOR USE IN ARC WELDING

Emmett A. Smith, East Cleveland, Ohio, assignor to The Lincoln Electric Company, Cleveland, Ohio, a corporation of Ohio No Drawing. Application August 14, 1947, Serial No. 768,712

10 Claims. (Cl. 148—26)

The present improvements relate generally to welding compositions or fluxing materials designed to be placed on the work in the course of an arc welding operatiion in order to provide a protective blanket over the pool of molten metal which results from such operation. More particularly, such improvements have to do with a composition or material designed for use in so-called deep flux welding, i. e. an arc welding process in which an arc is maintained between a metallic electrode and the work, the arc and the deposited weld metal being protected from the atmosphere by a layer of powdered or granular material deposited on the work to a depth sufficient to submerge the arc as the latter is caused to traverse the line or seam to be welded.

The use of such deep flux layer in arc welding has been known and practiced for a number of years past (see Patent No. 1,782,316 to B. S. Robinoff et al. dated November 18, 1930, and article entitled "New pipe mill at McKeesport Works of National Tube Company," The Iron Age May 17, 1931, pp. 1502 et seq.). However, despite certain well recognized advantages of such procedure, a great deal of difficulty has been experienced in finding a flux composition that will perform satisfactorily therein under all conditions, as evidenced by the considerable number of patents taken out during the past decade on such compositions.

Of the latter, the ones which have found widest commercial use have included as a major constituent one or more prefused granular metallic silicates selected from the group of manganese, calcium, magnesium and aluminum silicates. Thus one such composition which has been extensively manufactured and used during recent years for the indicated purpose has contained a major proportion of calcium silicate, while another has consisted substantially entirely of manganese silicate. In such compositions it has been customary to include a minor amount of an auxiliary fluxing material such as a metallic fluoride, e. g. fluorite or cryolite. Boron compounds, e. g. boro-silicate glass, have also been suggested for use as auxiliary fluxes, the function of which is to modify or control the viscosity and other characteristics of the welding composition, as well as to act as a solvent for oxides which may be formed from the deposited metal during welding.

In using fluxing compositions such as those just described, difficulty has been encountered particularly in those in which manganese silicate is a major constituent, in that the surface of the finished weld or so-called bead left along the weld line shows cross markings or other configuration instead of being perfectly smooth as is desirable. It is to be assumed that the gas bubbles generated at the surface of the bead along the line where the scale and other oxides are washed by the molten flux, as well as the gas generated in the molten metal, travel up along the surface of the latter beneath the overlying molten body of flux and escape through the latter. Since the viscosity of the steel is probably less than the viscosity of the flux, such gas bubbles prefer to travel through the molten metal during the time when it is solidifying and therefore leave a depression in the surface of the bead which may or may not be filled in by such molten flux. There is also reason to believe that the interfacial tension is a function of the materials involved and that the addition of agents which do not change the melting point to any measurable degree but affect such interfacial tension in the manner of wetting agents may have a beneficial effect in the production of a smooth weld or bead.

Regardless of the theory of interfacial tension and relative viscosity of the molten flux and metal, I have discovered that a very small addition of certain selected metals or of their oxides or equivalent compounds thereof, to a welding composition or flux material of the type described has a remarkably beneficial effect.

The following description accordingly sets forth in detail certain products exemplifying my invention, such disclosed products constituting, however, but several of various applications of the principle of the invention.

The application of such principle may be best illustrated in connection with the commercial welding composition or flux previously referred to as consisting substantially entirely of preformed or prefused manganese silicate. Preferably such material comprises the compound which results from the fusion at a temperature of at least 2000° F. of a mixture of manganese oxide, in the form of the naturally occurring ore, and silicon oxide or silica sand, together with a small amount of a fluoride. The proportion of the two oxides employed should be approximately that of their combining weights to form manganese silicate; however, a slight excess of manganese oxide is not objectionable and may in fact be advantageous. As a result of fusion at the temperature indicated, the ingredients form a compound which for want of a better term may be considered a complex fluoxy-silicate. Sodium aluminum fluoride $3NaF \cdot AlF_3$, which occurs in the form of the mineral cryolite, calcium fluoride which similarly occurs in the form of the mineral fluorspar, will preferably be employed as the fluoride in the foregoing mixture. However, aluminum, fluoride, sodium fluoride or other fluorides may be employed instead of cryolite. The amount of the fluoride thus employed may be as much as 15% of the total weight, although I have found that where a further ingredient is added, as presently described, the amount of fluoride may be reduced.

For example, a batch of materials which upon fusion will produce a manganese-silicate flux of desired composition will comprise approximately 4 parts by weight of manganese oxide, 2½ parts of silica and 1 part of cryolite or fluorspar. A typical composition of such batch would be as follows, viz.:

| | Pounds |
|---|---|
| Manganese oxide | 1,260 |
| Silica (quartz sand) | 828 |
| Cryolite (or fluorspar) | 312 |
| | 2,400 |

The ingredients composing the foregoing mixture are thoroughly intermixed and then fused together either in a closed electric furnace or externally fired hearth type furnace, at a temperature of approximately 2500° F. A longer period of heating e. g. up to 2½ hours, will be required in such last-mentioned type of furnace than in the first. Upon completion of the fusion step the fluid mass is run into a water bath whereby it is chilled in the form of fritted granules of varying size. Thereupon these granules, being thoroughly dried, are crushed between rolls to produce the desired granular product, the particle size being such as will pass through a 10-mesh screen but be retained on a 200-mesh screen.

A typical analysis of the product obtained from a mixture of ingredients fused together in the manner just described will be approximately as follows, viz.:

| | Percent |
|---|---|
| Manganese | 32 |
| Silicon | 19 |
| Oxygen | 35 |
| Fluorine | 4 |
| Other elements derived from raw materials used | 10 |

The permissible range of the elements just listed is indicated by the following table, viz.:

| | Percent |
|---|---|
| Manganese | from about 25 to 35 |
| Silicon | from about 15 to 20 |
| Fluorine | up to 6 |

It is assumed that the manganese oxide and silica will at least in part be combined to form manganese silicate and that similarly to the extent that fluorine is shown in the analysis of the finished product, this element is combined with the others in the form of fluoxysilicate, probably manganese fluoxysilicate. However, I have thus far been unable to determine by analysis the particular compounds which are thus formed.

In modifying the foregoing formula in accordance with the present invention, I include with the ingredients as set forth, a further addition of a very small amount of an oxide of lead, e. g. litharge PbO, or of antimony, e. g. the trioxide $Sb_2O_3$, or of bismuth, e. g. the trioxide $Bi_2O_3$.

The amount of such addition, conveniently measured in terms of the metal involved, may vary from between 0.10% to 0.50% in the case of lead, from 0.20% to 0.80% in the case of antimony, and from 0.02% to 0.20% in the case of bismuth. The range in the case of the last named metal, it will be seen, is higher than in the case of the others; but in all cases, a very small amount, i. e. a fraction of one percent (1%) has been found to be effective in beneficiating the resultant weld or bead.

Other compounds of the metals in question may be utilized, where the result will be to introduce the metal, or its oxide, into the resulting silicate complex. Thus bismuth carbonate, and lead carbonate and nitrate have been found satisfactory. Indeed, in the case of lead, even the sulphide gives the desired effect without any untoward results, since the amount of sulphur involved is so inconsequential and is furthermore reduced, if not eliminated, in the interfusion of the ingredients. I have also found that the lead can be introduced in the form of lead glass, the amount of the latter being calculated to give the desired amount of lead measured either as such or as the oxide. All of the foregoing compounds, it will be understood, are intended to be connoted by the term oxide as used in the claims which follow.

Because of the small amount of the metallic oxide, or equivalent compound, thus to be added, it is preferably first admixed with the cryolite, or other fluoride used, so as to insure thorough dissemination throughout the batch. Alternatively, such metallic oxide may be thus preliminarily admixed with a part only of one of the other ingredients that enter into the composition.

As indicated above, the use of an auxiliary fluxing material consisting of an oxide, or equivalent compound, of a metal selected from the group consisting of lead, antimony and bismuth in indicated small amount is not limited to a flux of the general type in question which is composed in major proportion of manganese silicate. In other words, the main body of the flux may, for example, consist of calcium silicate or aluminum silicate in predominant amount, with or without the inclusion of silicates of one or more of the group of metals consisting of manganese, calcium, magnesium and aluminum. However, the base material will preferably consist of manganese silicate, or where fluorine is combined in the manner described, of manganese fluoxy silicate. One important consideration in all cases is the reduction in the amount of fluoride, and particularly of fluorspar, that requires to be added to the ingredients which are fused together to form the finished product. Thus I have found that as little as 2-3% of fluorspar, or just enough to give the proper fusion of the manganese ore and sand will suffice, if a metal of the group described be added. Indeed, in some cases a satisfactory flux without any fluorine content may be obtained.

The present improved flux is used in the welding operation in the same manner as the previously described fluxes of the same general type. In other words, such flux is placed on the work along the line to be welded in a layer of sufficient depth to permit the end of the electrode to enter therein and thus submerge the arc that is established between such electrode and the work. While the result will be the fusion of the lower portion of the layer of flux, so that it may closely contact and cover the weld metal, the upper portion of the layer will retain its granular form, and if desired may be recovered and used over again.

Other modes of applying the principle of my invention may be employed instead of the one explained, change being made as regards the materials employed, provided the ingredients stated by any of the following claims or the equivalent of such stated ingredients be employed.

I therefore particularly point out and distinctly claim as my invention:

1. A flux suitable for use in arc welding where the arc is submerged in a layer thereof deposited along the line to be welded, such flux consisting essentially of a major proportion of a granular, prefused material selected from the group consisting of manganese, calcium, magnesium and aluminum silicates, and in combined state a fraction of one per cent of a metal selected from the group of lead, bismuth and antimony.

2. A flux suitable for use in arc welding where the arc is submerged in a layer thereof deposited along the line to be welded, such flux consisting essentially of a major proportion of a granular, prefused material selected from the group consisting of manganese, calcium, magnesium and aluminum silicates, said material containing in addition up to 6% of fluorine and less than 1% of a metal in combined state selected from the group of lead, antimony and bismuth.

3. A flux suitable for use in arc welding where the arc is submerged in a layer thereof deposited along the line to be welded, such flux being a granular, prefused material consisting essentially of a major proportion of a compound of silicon oxide and an oxide of a metal selected from the group consisting of manganese, calcium, magnesium and aluminum, together with an oxide of a metal selected from the group consisting of lead, antimony and bismuth, in amount of a fraction of one per cent content of such metal.

4. A flux suitable for use in arc welding where the arc is submerged in a layer thereof deposited along the line to be welded, such flux being a granular, prefused material consisting essentially of a major proportion of a compound of silicon oxide and an oxide of a metal selected from the group consisting of manganese, calcium, magnesium and aluminum, together with a metallic fluoride not exceeding 15% of the total and less than 1% of an oxide of a metal selected from the group consisting of lead, antimony and bismuth.

5. A flux suitable for use in arc welding where the arc is submerged in a layer thereof deposited along the line to be welded, such flux consisting essentially of a major proportion of granular prefused manganese silicate and in combined state a fraction of one per cent of a metal selected from the group of lead, bismuth and antimony.

6. A flux suitable for use in arc welding where the arc is submerged in a layer thereof deposited along the line to be welded, such flux consisting essentially of a major proportion of granular prefused manganese silicate and including up to 6% of fluorine and less than 1% of a metal in combined state selected from the group consisting of lead, bismuth and antimony.

7. A flux suitable for use in arc welding where the arc is submerged in a layer thereof deposited along the line to be welded, such flux consisting essentially of a major proportion of granular prefused manganese silicate and including up to 6% of fluorine and from 0.11% to 0.50% of lead in combined state.

8. A flux suitable for use in arc welding where the arc is submerged in a layer thereof deposited along the line to be welded, such flux consisting essentially of a major proportion of granular prefused manganese silicate and including up to 6% of fluorine and from 0.20% to 0.80% of antimony in combined state.

9. A flux suitable for use in arc welding where the arc is submerged in a layer thereof deposited along the line to be welded, such flux being a granular prefused material consisting essentially of a major proportion of a compound of silicon oxide and manganese oxide together with an oxide of a metal selected from the group consisting of lead, bismuth and antimony, in amount of a fraction of one per cent content of such metal.

10. A flux suitable for use in arc welding where the arc is submerged in a layer thereof deposited along the line to be welded, such flux being a granular prefused material consisting essentially of a major proportion of a compound of silicon oxide and manganese oxide together with a small amount of a metallic fluoride not exceeding 15% of the total and less than 1% of an oxide of a metal selected from the group consisting of lead, bismuth and antimony.

EMMETT A. SMITH.

REFERENCES CITED

The following references are of record in the file of this patent:

UNITED STATES PATENTS

| Number | Name | Date |
|---|---|---|
| 1,108,592 | Lincoln | Aug. 25, 1914 |
| 2,435,852 | Stringham | Feb. 10, 1948 |